No. 680,179. Patented Aug. 6, 1901.
L. C. SCHONEMAN.
TOILET DISINFECTING APPARATUS.
(Application filed Apr. 2, 1901.)
(No Model.)
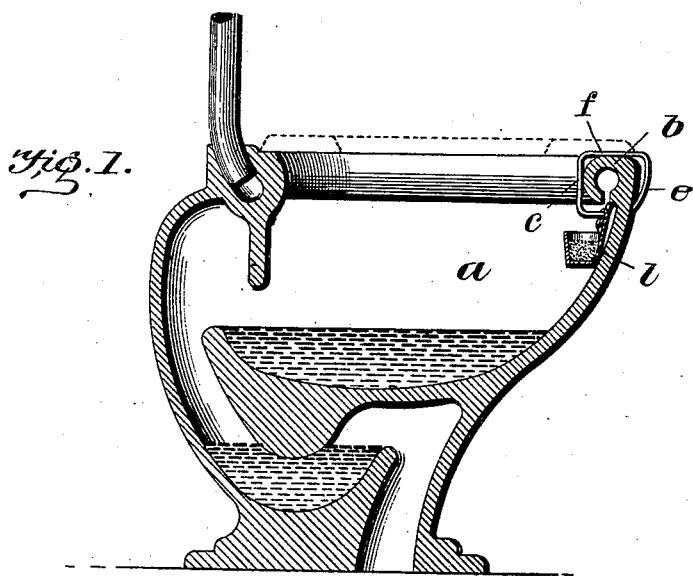
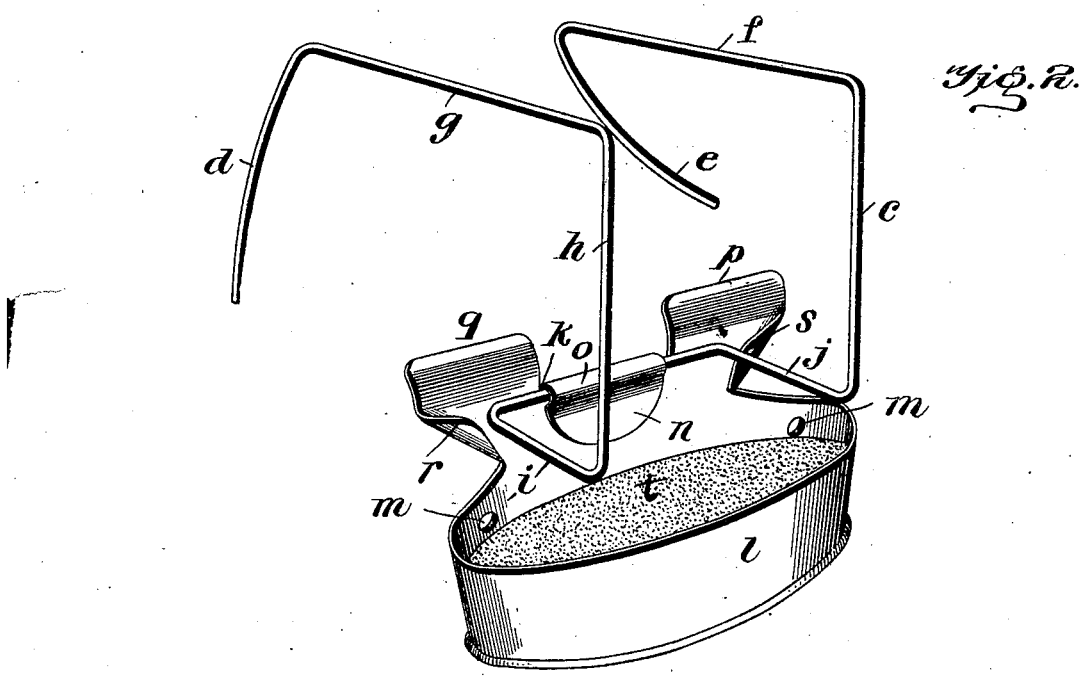
Witnesses
Inventor
L. C. Schoneman.
by Wilkinson & Fisher.
Attorneys
THE NORRIS PETERS CO., PHOTO-LITHO., WASHINGTON, D. C.

UNITED STATES PATENT OFFICE.

LEON C. SCHONEMAN, OF NEW YORK, N. Y.

TOILET-DISINFECTING APPARATUS.

SPECIFICATION forming part of Letters Patent No. 680,179, dated August 6, 1901.

Application filed April 2, 1901. Serial No. 54,102. (No model.)

*To all whom it may concern:*

Be it known that I, LEON C. SCHONEMAN, a citizen of the United States, residing at New York, in the borough of Manhattan and State of New York, have invented certain new and useful Improvements in Toilet-Disinfecting Apparatus; and I do hereby declare the following to be a full, clear, and exact description of the invention, such as will enable others skilled in the art to which it appertains to make and use the same.

My invention relates to an improvement in toilet-disinfecting apparatus; and the object of my invention is to produce a simple, cheap, and efficient apparatus of this kind.

In the accompanying drawings, Figure 1 is a cross-section of a vessel or bowl having my improvements applied thereto, and Fig. 2 is a perspective view showing the receptacle for the disinfectant material and the clip for holding the same in position in the bowl.

$a$ represents the bowl, of the ordinary or any common pattern, provided with a flushing-rim $b$. A clip is designed to fit over the outside of the rim $b$ of the bowl and to hold the receptacle in place. This clip has two outwardly-curved ends $d$ and $e$, designed to fit on the outside of the flushing-rim $b$. It has two horizontal portions $f$ and $g$, which extend over the flushing-rim, two vertical portions $c$ and $h$, extending down in front of the flushing-rim, and two backwardly-extending portions $i$ and $j$, connected by a horizontal portion $k$, the whole clip being preferably made of a single wire bent as indicated above. On the horizontal portion $k$ is supported the receptacle for the disinfectant material. This receptacle consists of a body $l$, preferably oval in form, provided with perforations $m$ in the sides and bottom thereof. The rear side of this receptacle is extended up for a considerable distance, forming an extension, the central part $n$ of which is cut and bent down, the upper part forming a cylindrical portion $o$, which fits over the part $k$ of the clip. The bending down of this central portion leaves two projecting ears $p$ and $q$. The lower corners of these projecting ears are bent up, as shown at $r$ and $s$, thus forming two inclined channels, which are directed toward each other and toward the center of the receptacle. Owing to the shape of the clip, the receptacle is necessarily held in contact with the side of the bowl, and the ears $p$ and $q$ are therefore brought directly under the perforations in the flushing-rim. This is a feature of considerable importance in my invention.

Another important feature is the inclined channels formed by the bent-up corners $r$ and $s$. These features are of importance for the following reasons: The receptacle when sold is usually filled with disinfectant material $t$ up as far as the holes $m$. When the water is directed through the rim $b$, the extending ears $p$ and $q$ catch a portion of it, and the channels formed by the bent-up corners $r$ and $s$ direct the water, which is caught in two converging streams, over the top of the disinfectant material $t$. This directing together of two converging streams is a feature of the highest importance in my invention, for the reason that it causes the disinfectant material to be worn away or dissolved by the water.

By experience I have found that unless some positive means is used for causing the water to circulate over the surface of the disinfectant material the latter will not wear away in sufficient quantity to produce the disinfecting effect, which is very disadvantageous. By my apparatus the wear of the disinfectant material is practically effected over the whole upper surface thereof.

Having thus described my invention, what I claim as new, and desire to secure by Letters Patent of the United States, is—

1. In a toilet-disinfecting apparatus, the combination with a bowl, means for flushing said bowl, a supporting-clip and a receptacle for disinfectant material, said receptacle being provided with ears and bent-up portions forming channels.

2. In a toilet-disinfecting apparatus, the combination with a supporting-clip and a receptacle carried thereby, said receptacle being provided with perforated sides with rear extensions and with bent-up corners forming channels inclined toward each other.

3. In a toilet-disinfecting apparatus, a receptacle consisting of a perforated body portion having at its rear an extension, the center part of said extension being bent down for attachment to a suitable support, leaving two projecting ears, the lower corners of said ears being bent up to form inclined channels.

In testimony whereof I affix my signature in presence of two witnesses.

LEON C. SCHONEMAN.

Witnesses:
EDITH N. EVERTS,
J. W. DARLEY, Jr.